Apr. 24, 1923.
D. A. BRADING
1,452,589
ELECTROLYTIC CELL
Filed Sept. 23, 1922  3 Sheets-Sheet 3
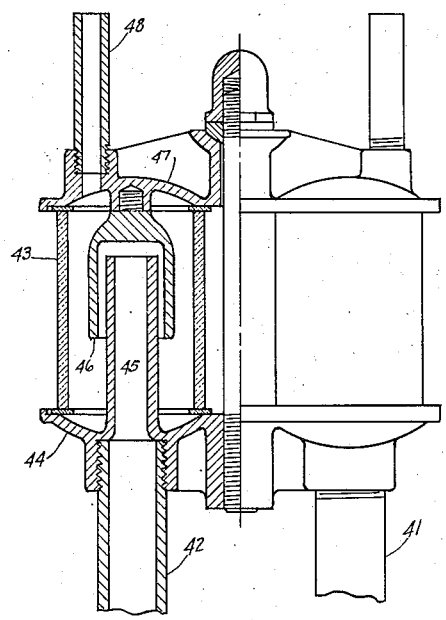
FIG. 5
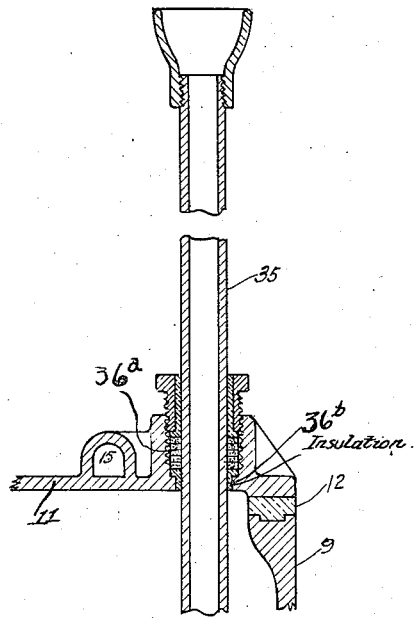
FIG. 6
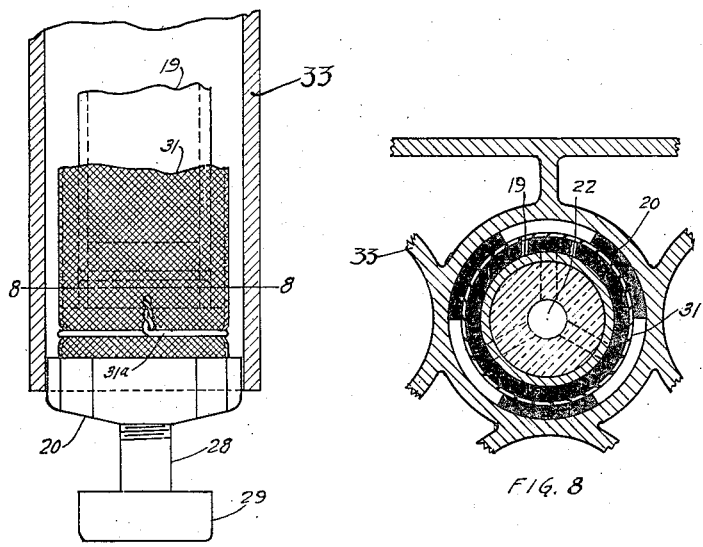
FIG. 7
FIG. 8
WITNESSES:-
Mary E. Brading
Willis King
INVENTOR:- Dennis A. Brading
ATT'Y. D Bruce King Patented Apr. 24, 1923.

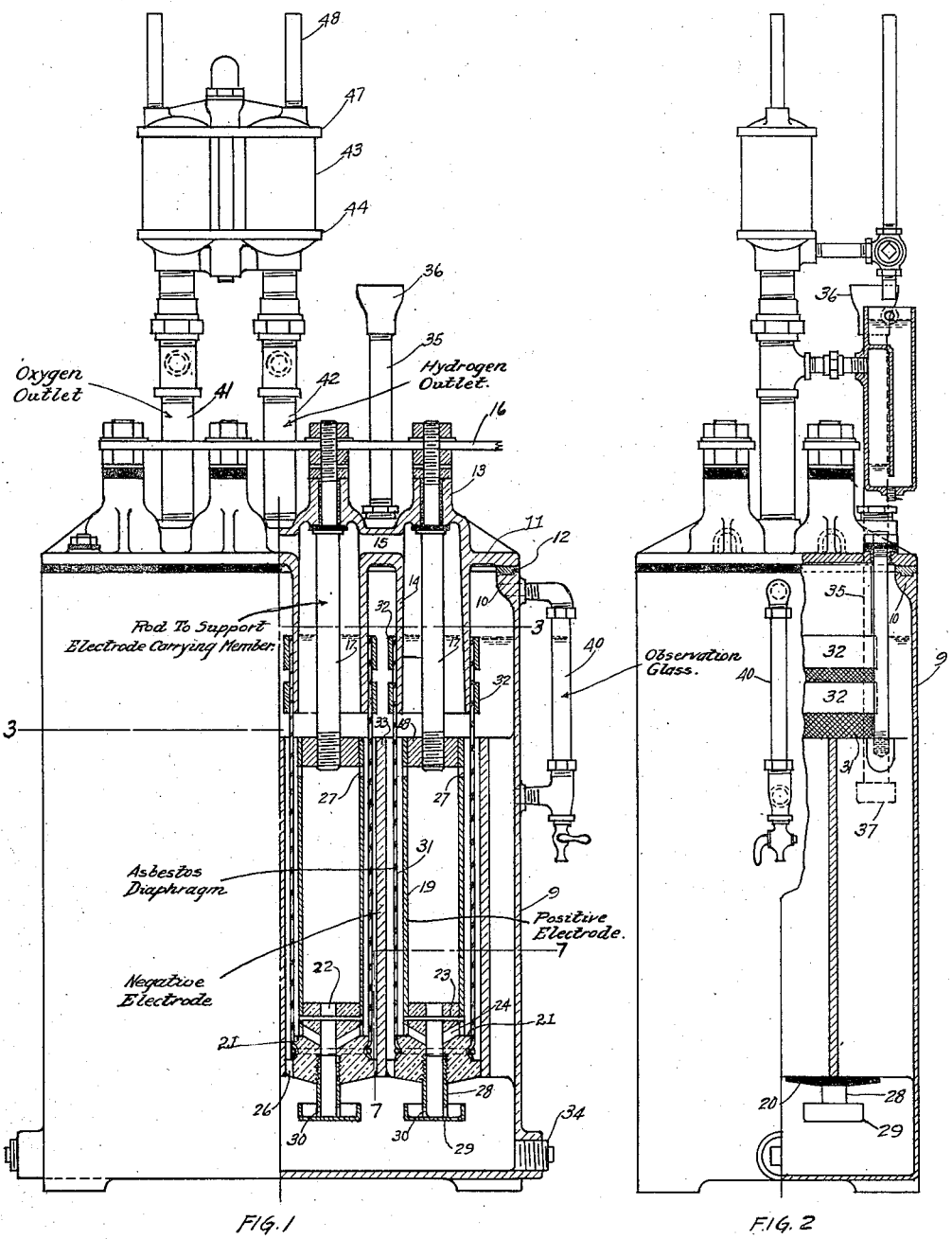

1,452,589

UNITED STATES PATENT OFFICE.

DENNIS A. BRADING, OF CHICAGO, ILLINOIS.

ELECTROLYTIC CELL.

Application filed September 23, 1922. Serial No. 590,043.

*To all whom it may concern:*

Be it known that I, DENNIS A. BRADING, a citizen of the United States, residing in Chicago, Cook County, State of Illinois, have invented certain new and useful Improvements in Electrolytic Cells, of which the following, taken in connection with the drawings, is a description.

My invention relates to an electrolytic cell of the kind described in my pending application, Serial No. 537,693, filed February 20, 1922, used in the process of electrolytic production of hydrogen and oxygen gas.

It is an object of my invention to provide a cell having greater electrode surface upon a given floor space, and one which will produce greater electrical efficiency, by an arrangement of the plates or electrodes as hereinafter explained; and by the construction of a cell comprising fewer parts than any cell now known to me, all so arranged that I am able to reduce the resistance of the current passing through the solution whereby I increase the electrical efficiency of my apparatus over that of any electrolytic cell now known to me.

It is a further object of my invention to produce an electrolytic cell having great electrode surface for a given amount of floor space required; a construction which comprises few parts which are easily assembled, requiring a minimum of space and utilizing to advantage the fact that hydrogen requires approximately double the volume that oxygen requires, I am able to provide a negative electrode which is larger in diameter than the positive electrode by assembling the electrodes concentrically with respect to each other in a manner to efficiently increase the production of gas, decrease the cost thereof, and at the same time occupy less space for the installation of the apparatus.

The arrangement of the electrodes herein and the manner of sustaining them in proper relation to each other I consider of importance in my present construction. The means that I provide for maintaining the electrodes in position are readily accessible for replacement when needed.

I provide in this construction means for entirely enclosing the cell and electrodes contained therein to prevent any odor from escaping into the room.

In the accompanying drawings I have illustrated what I now consider the preferred form of an embodiment of the essential features of my invention which consists in the novel construction, arrangement and assembling of the parts therein shown, and in these drawings:—

Figure 1 is a side elevation partly in section,

Figure 2 is an end elevation of the same, partly in section,

Figure 5 is an enlarged detail of the inspection glasses partly in section, taken on line 5—5 of Figure 4;

Figure 6 is an enlarged fragmentary sectional detail of the means for introducing the solution into the receptacle, taken on line 6—6 of Figure 4;

Figure 7 is a sectional view taken on line 7—7 of Figure 1,

Figure 8 is a sectional view taken on line 8—8 of Figure 7.

Figure 3:
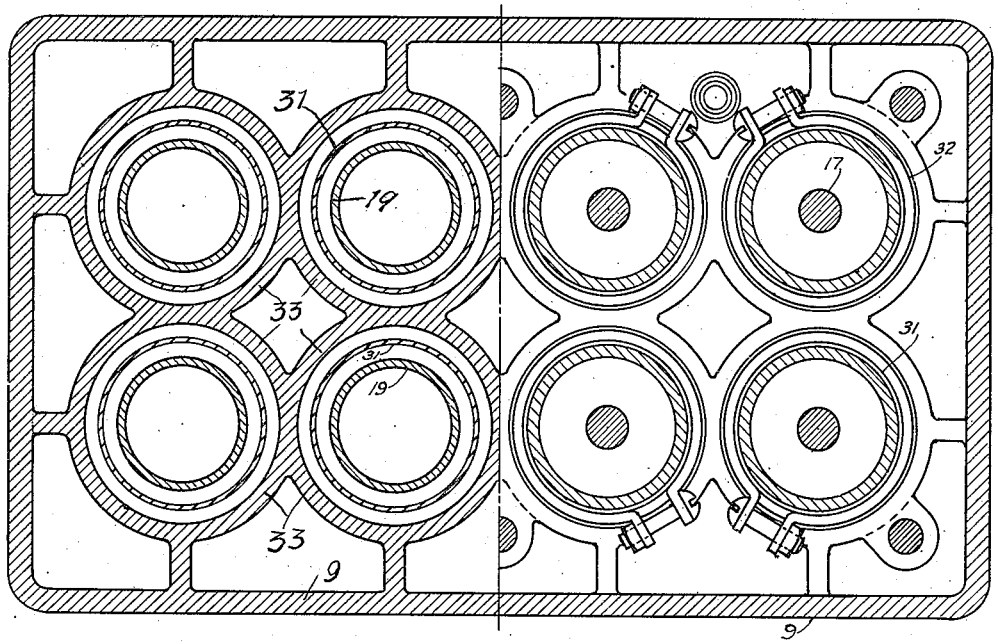
Figure 3 is a longitudinal section taken on line 3—3 of Fig. 1.
Figure 4:
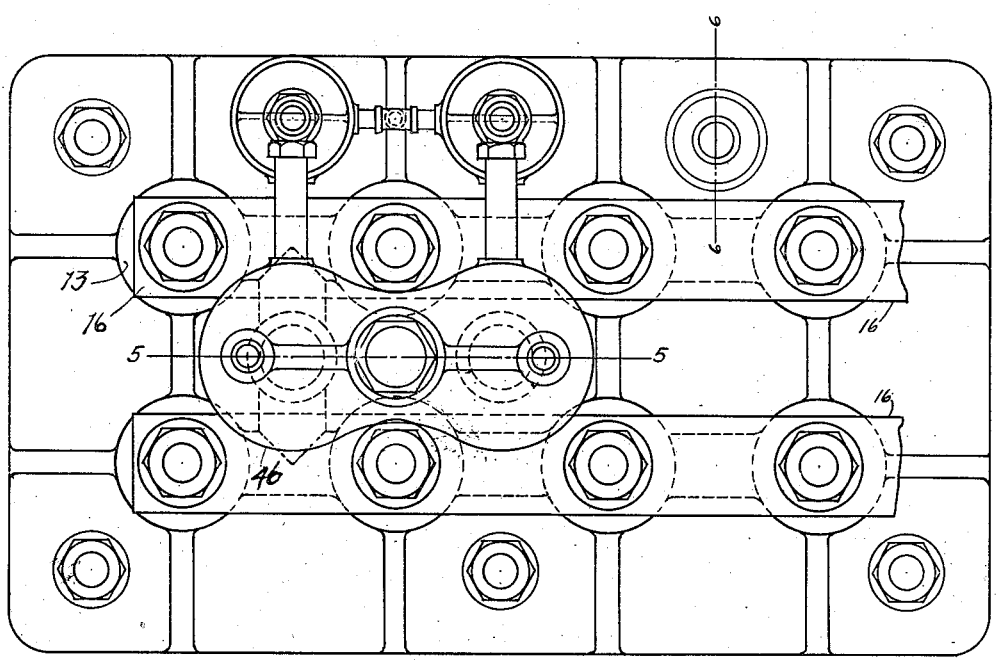
Figure 4 is a top plan view of the same.

Referring to the drawings the cell is constructed as follows:—

The cell is formed of a casing or receptacle 9, which may be of any shape desired, preferably square or rectangular, and formed of any kind of metal suitable for the purpose.

This casing or receptacle 9 is provided with an inturned flange 10, at the upper end thereof. A cast cap or cover 11 is provided for the casing 9 which is adapted to fit over the top thereof, resting upon a gasket 12 between said cover and the edge of the receptacle 9.

This cover 11 is preferably cast in a single piece and is provided with a plurality of tubular members each of which has a portion thereof 13, which extends upwardly above the cell and corresponding portion thereof 14 extending downwardly into the interior of the receptacle 9. The lower portion 14 of the tubular members are of larger diameter than the portion 13 which extends above the cell. 15 is a channel also formed in the cover 11 of the casing 9 through which the gas generated will pass to the point of exhaust. Bus bars 16 are supported above the tubular members 13, and have connection with a source of supply of electricity, which connections are not here shown.

As the bus bars are constructed they have a plurality of openings therein which fit over the tubular portion 13 above the cover 11.

Threaded onto each of the tubular members 13 is a rod 17, which extends downwardly within the receptacle and engages the plug 18 at the lower end thereof. Surrounding this plug 18 is a cylindrical positive electrode element 19 which extends downwardly within the casing 9, as shown in Fig. 1.

The lower end of the electrode 19 is closed by an insulating plug 20 which is secured in place within said electrode in any desired manner. This plug 19 is provided with a circumferential shoulder 21 mediate the length thereof whereby the diameter of the lower part of the plug is greater than the diameter of the upper part thereof. A central opening 22 is provided in said plug, also the transversely extending openings 23 and 24, each of which is coincident with openings 25—26, through the wall of the electrode 19.

The electrode 19 is also provided with openings 27 near the top for discharge purposes.

A tubular member 28 is threaded in a central opening 22 through the bottom of the plug 20. This tubular member is attached to the bottom of a cup 29, which is preferably cast in one piece, the upper edge of which cup terminates some distance below the lower edge of the plug 20. Openings 30 are provided in the tubular member 28 through which liquid passes into said cup.

Surrounding the lower portion of the plug 20 at its largest diameter is a cylindrical diaphragm 31, which is preferably formed of material such as asbestos. The upper end of this diaphragm surrounds the tubular member 14, and is secured thereto by clamps 32 or in any other desired manner. The lower end of the diaphragm is securely attached to the plug 20 by means of a wire 31ᵃ, or cord drawn tightly around said diaphragm and secured in the manner shown in Figure 7. Surrounding the diaphragm 31 but out of contact therewith is a negative electrode element 33, also cylindrical in form. This electrode is cast with the casing 9 and forms an integral part thereof.

Any number of these electrodes suitable for the size of receptacle used may be provided, and each being a duplicate of the other, the construction of one only has been described. A discharge pipe 34 extends from the bottom of the casing or receptacle 9.

Extending through the cover 11 is a filling pipe 35 which is provided with a funnel 36 at the upper end thereof. Suitable packing 36ᵃ and insulating bushing members 36ᵇ are provided around the pipe 35 as shown in Figure 6. At the bottom of the filling pipe which extends within the receptacle 9, is a cup 37, having a threaded member 38 which receives the pipe 35, and in which are the openings 39 through which the liquid is discharged into the receptacle.

Observation glasses 40 of the well known form of construction are attached to and in operative relation with the cell 9. Connecting with the cell 9 is an oxygen outlet pipe 41, and connecting with the channel 15 is a hydrogen outlet pipe 42 shown more clearly in Figure 5. An inspection glass 40 is connected with each of these pipes 41 and 42 through which the discharging gas passes on its way to storage and through which the operation of the cell may be determined. These inspection glasses are of the well known form of construction now in general use for this purpose and each comprises a transparent cylinder or casing 43 mounted upon the base 44 which in turn is supported upon the pipe 41 or 42.

The pipe 42 has communication with the tubular member 45 (Fig. 5) which extends upwardly into an inverted cup 46, supported from the top or cover 47, within the cylinder 43. 48 is a discharge pipe extending to a storage tank where desired.

I claim:—

1. In an electrolytic cell for generating hydrogen and oxygen, the combination of a casing, a plurality of electrodes arranged in pairs positioned vertically in said casing, each electrode being cylindrical and each pair thereof arranged concentrically with respect to each other, a cylindrical diaphragm between each pair of electrodes and spaced apart therefrom, an insulating member in the inner electrode, a tubular member supported on said insulating member and being in open communication with the interior of the casing.

2. In an electrolytic cell for generating hydrogen and oxygen, the combination of a casing and cover therefor, said cover having formed integrally therewith a plurality of upwardly extending tubular members each having a corresponding number of downwardly extending tubular members of larger diameter, each of said tubular members supporting a rod extending downwardly in said cell, a cylindrical electrode supported on said rod, an insulating member engaging the lower end of said cylindrical electrodes, said insulating member having an outer circumferential shoulder thereon, a cylindrical diaphragm engaging said insulating member at the bottom thereof and engaging the corresponding tubular member at the top thereof, a cylindrical electrode surrounding said diaphragm, the aforesaid electrodes and diaphragm being arranged concentrically and out of contact with each other the entire length thereof.

3. In an electrolytic cell for generating hydrogen and oxygen, the combination of a casing having a plurality of cylindrical negative electrodes formed integrally therewith, a cover for said casing, said cover having a plurality of tubular members extending above and below the cover portion, a cylindrical positive electrode positioned within each aforesaid negative electrode but out of contact therewith, an insulating member closing the bottom of each positive electrode, a cylindrical diaphragm between each positive and negative electrode, and means for holding said diaphragm out of contact with both electrodes.

4. In an electrolytic cell for generating hydrogen and oxygen, the combination of a casing having a plurality of cylindrical negative electrodes formed integrally therewith and arranged in spaced apart relationship to each other, a cover for said casing, tubular members formed integrally therewith and extending above and below said cover, a positive cylindrical electrode positioned within each of the aforesaid negative electrodes but out of contact therewith, means for maintaining said positive electrodes in vertical position concentrically with the negative electrode, an insulating member in the bottom of the positive electrode, a diaphragm extending from said insulating member to each corresponding tubular member, and means for maintaining said diaphragms in vertical position and out of contact with both electrodes.

5. In an electrolytic cell for hydrogen and oxygen, the combination of a casing having a plurality of vertically disposed cylindrical negative electrodes formed integrally therewith and arranged in spaced apart relationship to each other, a cover for said casing, said cover having tubular members formed integrally therewith and extending above and below said cover, a positive electrode positioned concentrically with respect to each negative electrode, a diaphragm between each positive and negative electrode and out of contact with each electrode, an insulating member in each positive electrode, said member having an outer circumferential shoulder thereon, a diaphragm between each pair of electrodes and out of contact therewith, a tubular member having connection with the interior of the positive electrode, said member having openings therethrough at the bottom forming communication with the chamber within the casing of the cell.

In testimony whereof I have signed this specification.

DENNIS A. BRADING.